United States Patent Office 3,577,266
Patented May 4, 1971

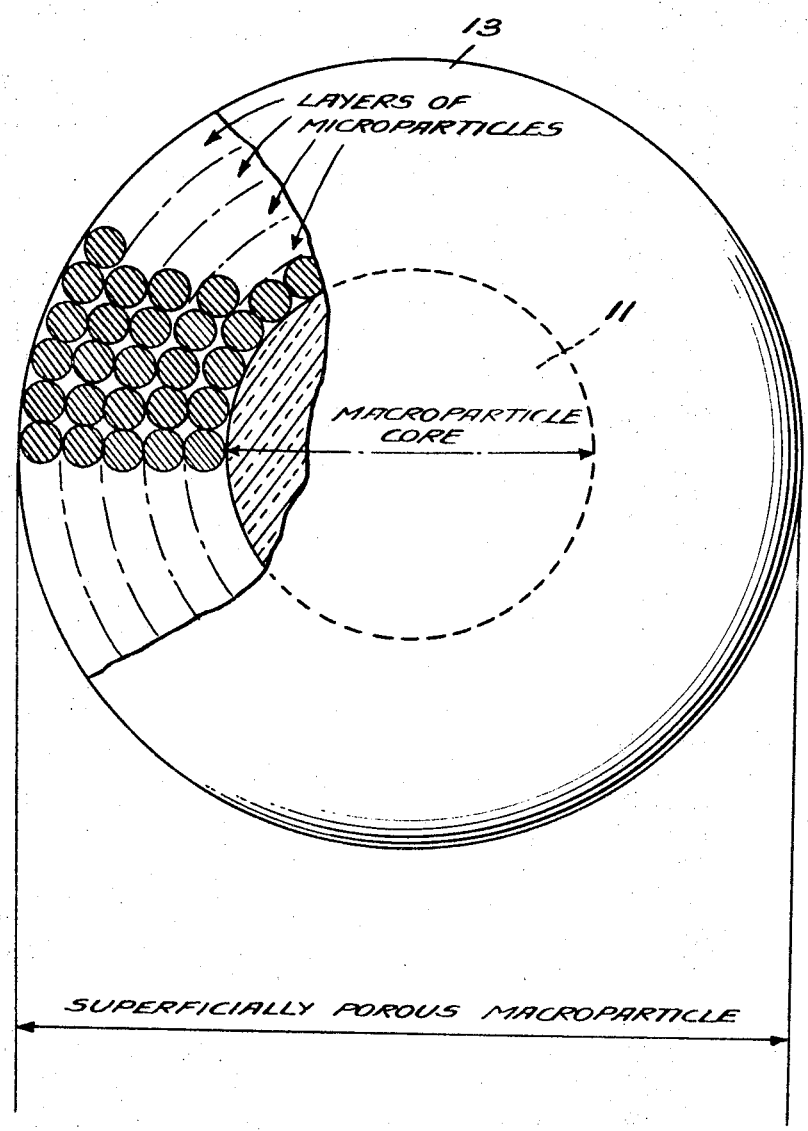

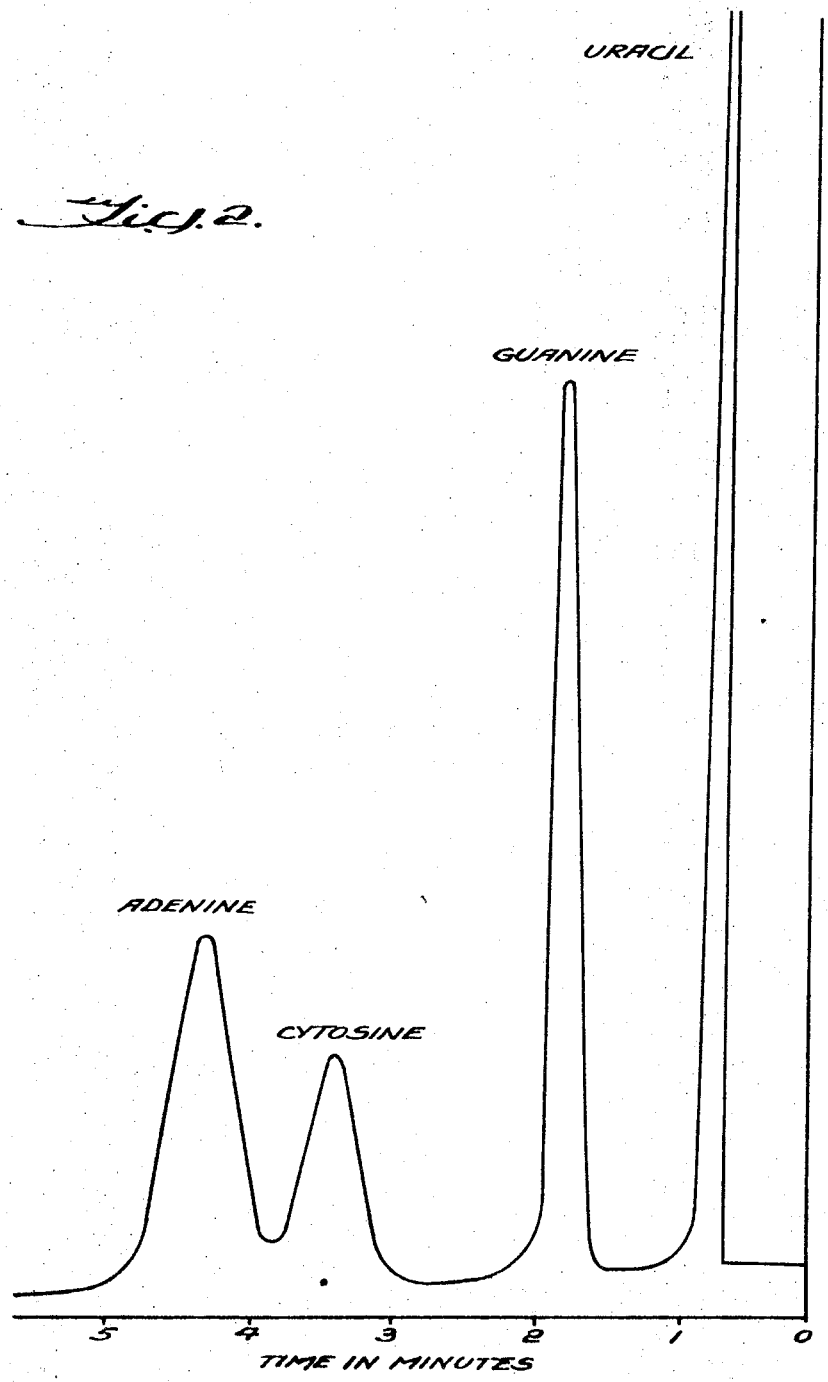

3,577,266
SUPERFICIALLY POROUS CHROMATOGRAPHIC PACKING WITH SULFONATED FLUOROPOLYMER COATING
Joseph J. Kirkland, New Castle County, Del., assignor to E. I. du Pont de Nemours and Company, Wilmington, Del.
Filed Jan. 13, 1969, Ser. No. 790,724
Int. Cl. B44d 5/00
U.S. Cl. 117—100
8 Claims

ABSTRACT OF THE DISCLOSURE

A coating of a polymer of the compound

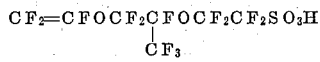

on a support of superficially porous silicious beads serves as a sorptively active, chemically stable chromatographic packing material. Such chromatographic packing permits highly selective, high-speed cationic exchange separations of a wide variety of mixtures.

BACKGROUND OF THE INVENTION

(1) Field of the invention

This invention relates to a novel packing material for chromatographic columns. The unique physical properties of superficially porous macroparticles combined with the properties of the hereindescribed sulfonated fluoropolymer yield sorptively active packing material which gives excellent results in chromatographic separations.

(2) Description of the prior art

Chromatographic separations performed with packing containing an ion-exchange resin are well known. Separations with ion-exchange resins containing active groups in the surface only are shown by K. W. Pepper in Chemistry Research, Her Majesty's Stationary Office, London, England (1952) and by J. R. Parrish in Nature, 207, 402 (1965). The use of glass beads coated with ion-exchange resins has been described by C. G. Horvath, B. A. Preiss and S. R. Lipsky in Analytical Chemistry, 39, 1422 (1967). Chromatographic packing composed of impervious cores coated with sorptively active material is described in U.S. 3,340,085 to Halasz and Horvath. However, none of these prior teachings describe chromatographic packings composed of a sulfonated fluoropolymer coated on macroparticles having a superficially porous surface composed of sequentially adsorbed discrete monolayers of microparticles. Use of these macroparticles increases the efficiency and reproducibility of chromatographic separations as result of the high surface porosity and uniformity of particle dimensions and pore size.

In copending application S.N. 647,506, filed June 20, 1967, and patented as U.S. 3,505,785 Kirkland describes the improved results obtained with chromatographic columns having as the packing material superficially porous macroparticles, which are described therein. It has been found that such macroparticles yield unexpectedly superior results in cation-exchange chromatographic separations when they are coated with a polymer of the compound

Said polymer is described in U.S. Pat. 3,282,875 by Connolly and Gresham, filed July 22, 1964, wherein its structure and properties are also disclosed. Its chemical stability and high sorptive activity enable the preparation of highly effective, durable packing material for chromatographic columns. Commercial ion-exchange resins are chemically and mechanically much less stable so as not to economically justify their use on superficially porous glass beads as described in S.N. 647,506. Moreover, the increased mechanical stability of the subject packing material makes possible the use of high column input pressures, at which conventional packings tend to collapse.

SUMMARY OF THE INVENTION

Improved results in chromatographic separations are obtained with a novel packing material comprising superficially porous macroparticles with impervious cores, said macroparticles being coated with a sulfonated fluoropolymer containing the repeating unit characterized by the formula

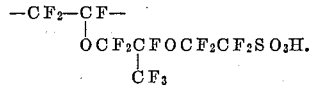

The superficially porous macroparticles comprise impervious cores such as glass beads which are coated with a plurality of sequentially adsorbed, discrete monolayers of microparticles. The structure, preparation, and usefulness in chromatography of the macroparticles is disclosed in the copending U.S. application, S.N. 647,506, by Kirkland.

The sulfonated fluoropolymer may be a homopolymer or a copolymer of the compound having the formula

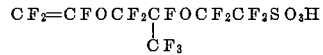

When a copolymer is used, suitable comonomers are the fluorinated ethylenes such as tetrafluoroethylene, vinyl fluoride and trifluoroethylene.

The novel combination of said polymer and said macroparticles provides an improved chromatographic packing material.

BRIEF DESCRIPTION OF THE DRAWINGS

FIG. 1 is a diagrammatical representation of a macroparticle of this invention.

FIG. 2 is a chromatogram showing the superior results of a separation of the nucleic acid bases from RNA using the chromatographic packing of this invention.

DETAILED DESCRIPTION

The novel chromatographic packing material of this invention is made by coating superficially porous macroparticles with the described sulfonated fluoropolymer. The macroparticles may be produced by the process of Canadian Pat. No. 729,581 which consists of coating impermeable macroparticle cores with a series of unlike, oppositely charged, sequentially adsorbed monolayers of like colloidal microparticles. (By "like particles" it is meant that the particles of any given monolayer are of similar charge, and preferably, although not necessarily, of the same chemical composition.) The coating process causes the coating to be irreversibly joined to the macroparticle by means of electrostatic forces in the nature of a chemical or partial valence bond.

As described in Ser. No. 647,506, coating is accomplished by contacting macroparticles bearing a surface charge with a colloidal dispersion of material which has an opposite charge. These colloidal particles will be attracted to the oppositely-charged macroparticles and become electrostatically bonded thereto. The surface of the macroparticle will then assume an electrical charge which is now opposite to that which was on the surface originally. The reason for this is that once the colloidal particle sticks to the macroparticle, the surface charges are neutralized so the coated spot no longer appears oppositely charged to the colloidal particles remaining in the dispersion. Therefore, no further colloidal particles will be attracted, and there will be no further build-up of particles at that spot. Excess colloid is removed by rinsing, and the coated macroparticle is then immersed in a second colloidal dispersion of microparticles of charge opposite from those of the first. Repeating the process by alternating immersions between positively and negatively charged microparticle dispersions results in the adsorption of further monolayers in sequence. Each monolayer will be of a different material than those adjacent. After the desired number of monolayers of microparticles has been built up, the macroparticles are washed, rinsed and dried under vacuum. FIG. 1 is a representation of the cross-section of a macroparticle, showing the impervious core 11 and the layers of microparticles 13. The sulfonated fluoropolymer coating, not shown, is applied to the macroparticle shown in FIG. 1 so as to cover not only the exterior of the macroparticle but also the inner surface of the pores created by spaces between the microparticles.

The macroparticles described above and shown in FIG. 1 are coated with polymer of this invention as exemplified by the following procedure:

Twenty grams of superficially porous macroparticles, having an effective surface area of about 0.65 m.$^2$/g., are placed in a sintered glass Buchner funnel, and an excess of 1% "Chlorhydrol" (a basic alumina supplied by Reheis Co., Berkeley Heights, N.J.) solution is added. The mixture is allowed to stand for 5 minutes with occasional stirring. Excess liquid is filtered off and the bed washed twice with 50 ml. portions of distilled water. The treated bed is air-dried on the filter and then heated for 1 hour at 115° C. in an air oven. (This treatment of the macroparticles with "Chlorhydrol" leaves a monolayer of positively charged microparticles on the surface. Subsequent treatment of the surface with the sulfonated fluoropolymer, which is negatively charged in solution, results in a uniform, tightly-bound layer of polymer on the surface.)

The ion exchange packing is prepared by slurrying the "Chlorhydrol" treated macroparticles with a 0.5% solution of sulfonated fluoropolymer in ethanol. The ethanol is removed by evaporation while gently stirring the mixture under a stream of dry nitrogen and gently heating on a steam bath. The resulting dry mixture is then dried for 1 hour at 150° C. in a vacuum oven (about 1 mm. Hg).

As may be seen from the above-described procedure, the chromatographic packing macroparticles of this invention consist of impermeable cores with porous crusts, the microparticle layers comprising the porous crusts. The surface of the crust of each macroparticle is covered with a film of the polymer of this invention. Since the crust is porous, not only the outside of the macroparticle but also some of the interior of the porous crust provides surface area for fluid contact. Hence the term "surface" when used in connection with the macroparticles of this invention means the total effective surface of the macroparticle which includes the surface area of the interior of the porous crust which is available for fluid contact.

The macroparticles have an average diameter of 5 to 500 microns while the microparticles have an average diameter of 0.005 to 1 micron. The impervious cores constitute most of the macroparticle volume, the volume of said microparticles constituting from 0.002 to 25% of the volume of a macroparticle. The impervious cores may consist of glass, sand, alumina or ceramic material.

The sulfonated fluoropolymer of this invention has the repeating unit characterized by the formula

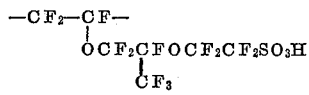

This polymer is uniquely suited for use on chromatographic packing macroparticles as described since it does not readily decompose as do many other ion-exchange resins.

The fluoropolymer has a very high ion-exchange capacity due to the polarity of the sulfonyl group, and since, unlike other sulfonyl-containing hydrocarbon ion-exchange resins such as sulfonated polystyrene, it is soluble in polar organic solvents such as alcohols. The solubility of the polymer, one of its more startling aspects, enables coating of a thin film on the entire effective surface of a macroparticle since the polymer solution can permeate the porous crust.

The polymer can be a homopolymer of

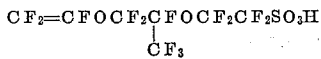

or a copolymer thereof. In the case of a copolymer, fluorinated ethylenes are the preferred comonomers. Examples of fluorinated ethylenes include those of the formula XCF=CF$_2$ wherein X is Cl, F or CF$_3$.

The preparation of sulfonyl fluorides, their polymerization including copolymerization with fluorinated ethylenes, and conversions of the sulfonyl fluoride group to the acid form (i.e. —SO$_3$H) are disclosed in U.S. Pat Nos. 3,301,893 to Putnam et al., 3,041,317 to Gibbs et al., and 3,282,875 to Connolly et al. and in U.S. patent applications Ser. No. 779,235 to Resnick and Ser. No. 779,273 to Grot, both filed Nov. 26, 1968.

In the copolymer of this invention, the sulfonyl-containing units should constitute at least 14 mole percent of the copolymer. A preferred copolymer is

having an equivalent weight of 960 (17 mole percent of the acid). Ten grams of this copolymer may be dissolved in 100 g. of n-butanol at room temperature to obtain a clear, film-forming solution. The preferred equivalent weight range of the copolymer is 600-2000.

An example of the superiority of the high-speed cation exchange packing of this invention is shown in FIG. 2 of the drawings. A separation of the nucleic acid bases (Adenine, Cytosine, Guanine and Uracil) from RNA is obtained in about 5 minutes, using a 1000 mm. x 2.1 mm. I.D. column operated at 63° C. with 0.01 N nitric acid as a carrier at a flow rate of 2.00 cc./min. This separation compares to the more than 60 minutes required for the separation of the same compounds by the fastest procedure described in the lierature (G. Goldstein, Anal. Biochem. 20, 477, 1967).

PROPERTIES OF THE CATION EXCHANGE CHROMATOGRAPHIC PACKING

The exchange capacity of the cation exchange packing was determined by a procedure in which zinc ion was allowed to exchange onto the active sites. After excess zinc ion was removed from the ion exchange packing, the exchanged zinc ion was eluted with strong hydrochloric acid and measured by atomic absorption spectrophotometry. Cationic exchange packing made in the manner described above exhibits an exchange capacity of 3.5 microequivalents per gram. This compares to the 5.3 microequivalents per gram of polymer acid equivalent which was weighed and placed on the surface by deposition of the polymer acid from ethanolic solution. These data indicate, therefore, that about ⅔ of the total strongly acid sulfonic groups are available for ion exchange.

The cation-exchange packing exhibits outstanding chemical stability. Columns of this material have been used for months without change in chromatographic characteristics. This packing may also be used with a wide variety of mobile phase carriers without degradation of the properties. This is in contrast to conventional cation resin exchange materials which have limited application for certain chromatographic separations in which certain reagents must be used as part of the mobile phase. The cationic packing herein described has been used at temperatures up to 80° C. with aqueous carriers without any noticeable change in properties.

The excellent mechanical stability of the packing makes it possible to use this material in columns with very high input pressures. For instance, in the separation shown in FIG. 2, the input pressure was 735 p.s.i. Input pressures of this magnitude cannot be used with conventional gel ion-exchange resins because of their poor mechanical properties. At high input pressures, packings with conventional gel ion-exchange resins tend to collapse, making the packing unsuitable for chromatographic purposes. Columns with the packing of this invention have been used at pressures up to 5000 p.s.i. with no difficulties, and much higher pressures should be feasible.

Because of the uniformity, mechanical rigidity, and relatively high density of the cation-exchange packing herein-described, chromatographic columns may be easily and reproducibly prepared with this packing using simple dry-packing techniques normally associated with the fabrication of gas chromatographic columns. This compares to the relatively laborious, time-consuming slurry-packing techniques which must be used with finely-divided conventional gel ion-exchange resins to prepare chromatographic columns of high quality.

Some matters related to this invention, including the preparation of the macroparticles and sulfonated fluoropolymers are more fully described in the cited references the disclosures of which are hereby expressly incorporated in this application.

I claim:
1. Macroparticles for use in chromatography, each of said macroparticles having an impervious core and a porous surface coating thereon, said porous surface coating comprising a multiplicity of monolayers of microparticles, each macroparticle having on its porous surface a coating of a polymer having the repeating unit of the formula

2. Claim 1 wherein said polymer is a homopolymer of said repeating unit.
3. Claim 1 wherein said polymer is a copolymer, at least 14 mole percent of said copolymer consisting of said repeating unit.

4. Claim 3 wherein said copolymer has a comonomer of the formula $XCF=CF_2$, wherein X is Cl, F or $CF_3$.
5. Claim 1 wherein said macroparticles have an average diameter of 5 to 500 microns, said microparticles having an average diameter of 0.005 to 1 micron, the volume of said microparticles constituting from 0.002 to 25% of the total volume of a macroparticle.
6. Claim 1 wherein said impervious core is made of glass, sand, alumina or ceramic materials.
7. Packing material for a chromatographic column comprising a plurality of macroparticles, each of said macroparticles comprising an impervious core with a porous crust, said crust comprising a plurality of monolayers of microparticles, the porous crusts of said macroparticles being coated with a polymer having the repeating unit of the formula

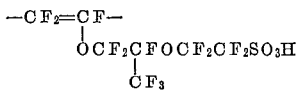

8. The packing material of claim 7 wherein said polymer is a copolymer of tetrafluoroethylene and the compound of the formula

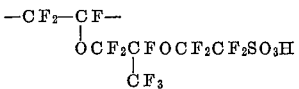

said compound constituting at least 14 mole percent of said copolymer.

References Cited
UNITED STATES PATENTS

| | | | |
|---|---|---|---|
| 2,292,406 | 8/1942 | Rothrock | 117—124X |
| 3,041,317 | 6/1962 | Gibbs et al. | 260—793 |
| 3,282,875 | 11/1966 | Connolly | 260—513 |
| 3,301,893 | 1/1967 | Putnam et al. | 260—513 |
| 3,340,085 | 9/1967 | Halasz et al. | 117—100X |
| 3,458,976 | 8/1969 | Hollis | 117—100X |
| 3,488,922 | 1/1970 | Kirkland | 210—198 |
| 3,505,785 | 4/1970 | Kirkland | 210—198X |

ALFRED L. LEAVITT, Primary Examiner

M. R. P. PERRONE, Jr., Assistant Examiner

U.S. Cl. X.R.
117—161; 210—198

PO-1050
(5/69)

UNITED STATES PATENT OFFICE
CERTIFICATE OF CORRECTION

Patent No. 3,577,266          Dated May 4, 1971

Inventor(s)    J. J. Kirkland

It is certified that error appears in the above-identified patent and that said Letters Patent are hereby corrected as shown below:

Column 6, line 17 (Claim 7), the formula reading

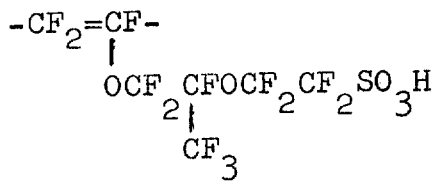

should read

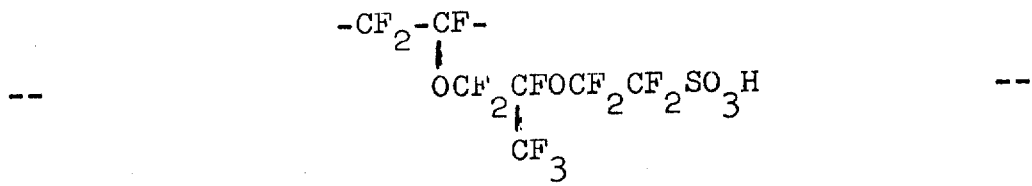

UNITED STATES PATENT OFFICE
CERTIFICATE OF CORRECTION

Patent No. 3,577,266  Dated May 4, 1971

Inventor(s) J. J. Kirkland

It is certified that error appears in the above-identified patent and that said Letters Patent are hereby corrected as shown below:

Column 6, line 24 (Claim 8), the formula reading

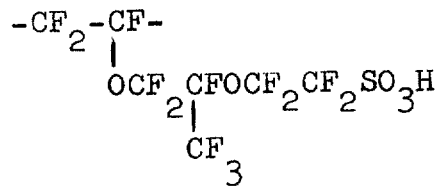

should read

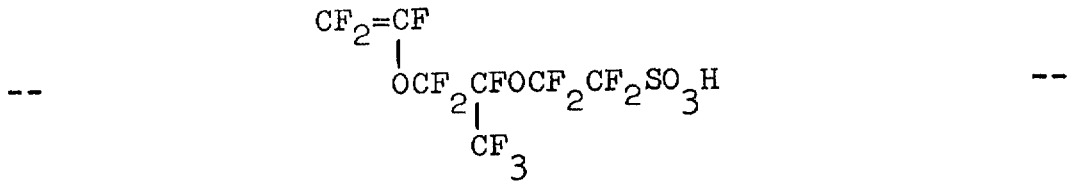

Signed and sealed this 19th day of October 1971.

(SEAL)
Attest:

EDWARD M. FLETCHER, JR.
Attesting Officer

ROBERT GOTTSCHALK
Acting Commissioner of Patents